US008161216B2

(12) United States Patent
Kung et al.

(10) Patent No.: US 8,161,216 B2
(45) Date of Patent: Apr. 17, 2012

(54) INTERFACE TRANSMISSION DEVICE AND METHOD (75) Inventors: Wen-Hsia Kung, Taoyuan County (TW); Wen-Che Wu, Hsinchu County (TW); Hsin-Hung Yi, Kaohsiung (TW)

(73) Assignee: Realtek Semiconductor Corp., Hsinchu (TW)

( * ) Notice: Subject to any disclaimer, the term of this patent is extended or adjusted under 35 U.S.C. 154(b) by 36 days.

(21) Appl. No.: 12/474,722

(22) Filed: May 29, 2009

(65) Prior Publication Data
US 2009/0300247 A1  Dec. 3, 2009

(30) Foreign Application Priority Data

May 30, 2008  (TW) ................. 97119995 A (51) Int. Cl.
*G06F 13/00* (2006.01)
(52) U.S. Cl. ......... 710/110; 710/106; 711/212; 370/252
(58) Field of Classification Search ............... 710/110; 711/212
See application file for complete search history.

(56) References Cited

U.S. PATENT DOCUMENTS

| 4,876,670 | A | * | 10/1989 | Nakabayashi et al. | 365/194 |
| 5,274,636 | A | * | 12/1993 | Halter et al. | 370/212 |
| 6,417,866 | B1 | * | 7/2002 | Man et al. | 345/660 |
| 6,425,030 | B1 | * | 7/2002 | Melcher | 710/110 |
| 6,532,506 | B1 | * | 3/2003 | Dunstan et al. | 710/100 |
| 6,539,443 | B1 | * | 3/2003 | Dunstan et al. | 710/106 |
| 7,143,215 | B2 | * | 11/2006 | Dunstan et al. | 710/104 |
| 7,519,005 | B2 | * | 4/2009 | Hejdeman et al. | 370/252 |
| 7,606,955 | B1 | * | 10/2009 | Falik et al. | 710/110 |
| 7,702,015 | B2 | * | 4/2010 | Richter et al. | 375/240.11 |

* cited by examiner

*Primary Examiner* — Brian Misiura
(74) *Attorney, Agent, or Firm* — Thomas, Kayden, Horstemeyer & Risley, LLP (57) ABSTRACT An interface transmission device and method are disclosed. The interface device, located in a first device, includes a transmission interface and a receiving circuit. The transmission interface receives an initialization signal and an interface signal. The receiving circuit receives the initialization signal through the transmission interface, and acquires a bit length of the interface signal according to the initialization signal. Thereby, the first device resolves the interface signal according to the bit length.

31 Claims, 8 Drawing Sheets

INTERFACE TRANSMISSION DEVICE AND METHOD

CROSS-REFERENCE TO RELATED APPLICATIONS

This non-provisional application claims priority under 35 U.S.C. §119(a) on Patent Application No(s). 97119995 filed in Taiwan, R.O.C. on May 30, 2008, the entire contents of which are hereby incorporated by reference.

BACKGROUND OF THE INVENTION

1. Field of Invention

The present invention relates to an interface transmission device and method, and more particularly to an interface transmission device and method using a single transmission line.

2. Related Art

Figure 1:
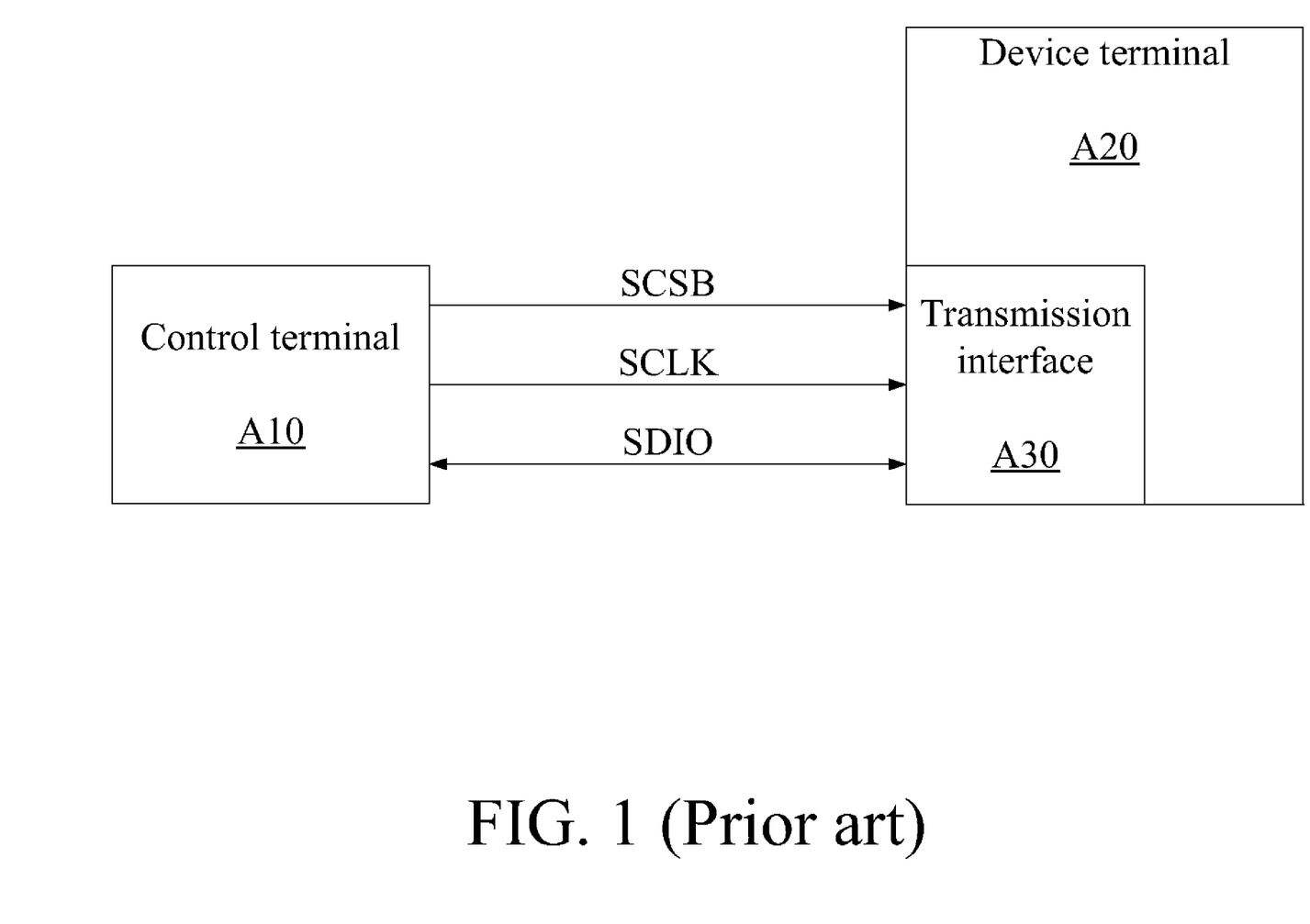
FIG. 1 is a schematic diagram of a conventional transmission interface.

FIG. 1 is a schematic diagram of a conventional transmission interface including a control terminal A10, a device terminal A20, and a transmission interface A30.

The control terminal A10 herein may be a micro controller unit (MCU) in a liquid crystal display (LCD) device, and the device terminal A20 may be a scaler IC in the LCD device. Seen from FIG. 1, in the prior art, data transmission is realized by three pins between the control terminal A10 and the device terminal A20, i.e., by three transmission lines in combination with the transmission interface A30. The three pins are SCSB, SCLK, and SDIO respectively.

The SCSB in the aforementioned three pins is used for transmitting a control signal, i.e., transmitting an enable signal, and also controlling the operation of the transmission interface A30. The SCLK is used for carrying a sample clock, and the SDIO is used for carrying addresses or data.

As electronic products are increasingly developed towards being light, thin, short, and small, integrated circuits (ICs) in the electronic products also require for a compact size. However, in the conventional transmission interface, multiple pins (SCSB, SCLK, and SDIO) are employed to realize address/data transmission between the control terminal A10 and the device terminal A20. As such, too many pins in the IC may lead to a bottleneck in reducing the size of the IC.

Therefore, it is a problem in urgent need of solutions to decrease the number of the pins on the transmission interface so as to facilitate size down-scaling of the IC.

SUMMARY OF THE INVENTION

Accordingly, the present invention is directed to an interface transmission device and method. The transmitting and receiving processes in the prior art can be realized by using a 1-bit serial communication interface, i.e., using a single transmission line. Thereby, the number of pins is significantly reduced, which not only saves the pin cost, but also facilitates the reduction of the volume of the IC.

An interface device, located in a first device, includes a transmission interface and a receiving circuit. The transmission interface receives an initialization signal and an interface signal. The receiving circuit receives the initialization signal through the transmission interface, and acquires a bit length of the interface signal according to the initialization signal. Thereby, the first device resolves the interface signal according to the bit length.

Another interface device, located in a first device, includes a transmission circuit and a transmission interface. The transmission circuit generates an initialization signal according to a bit length, and generates an interface signal according to the bit length. The initialization signal represents the bit length, and information about the interface signal is resolved according to the bit length. The transmission interface receives the initialization signal and the interface signal from the transmission circuit, and transmits the initialization signal and the interface signal.

A transmission method applicable to a transmission interface is also provided. The method includes: receiving an initialization signal and an interface signal through the transmission interface; acquiring a bit length of the interface signal according to the initialization signal; and resolving the interface signal to acquire information about the interface signal according to the bit length.

A transmission method applicable to a transmission interface is further provided. The method includes: generating an initialization signal according to a bit length, in which the initialization signal represents the bit length; generating an interface signal according to the bit length, in which information about the interface signal is resolved according to the bit length; and transmitting the initialization signal and the interface signal through the transmission interface.

Preferred embodiments and efficacies of the present invention will be illustrated below with the accompanying drawings.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 2:
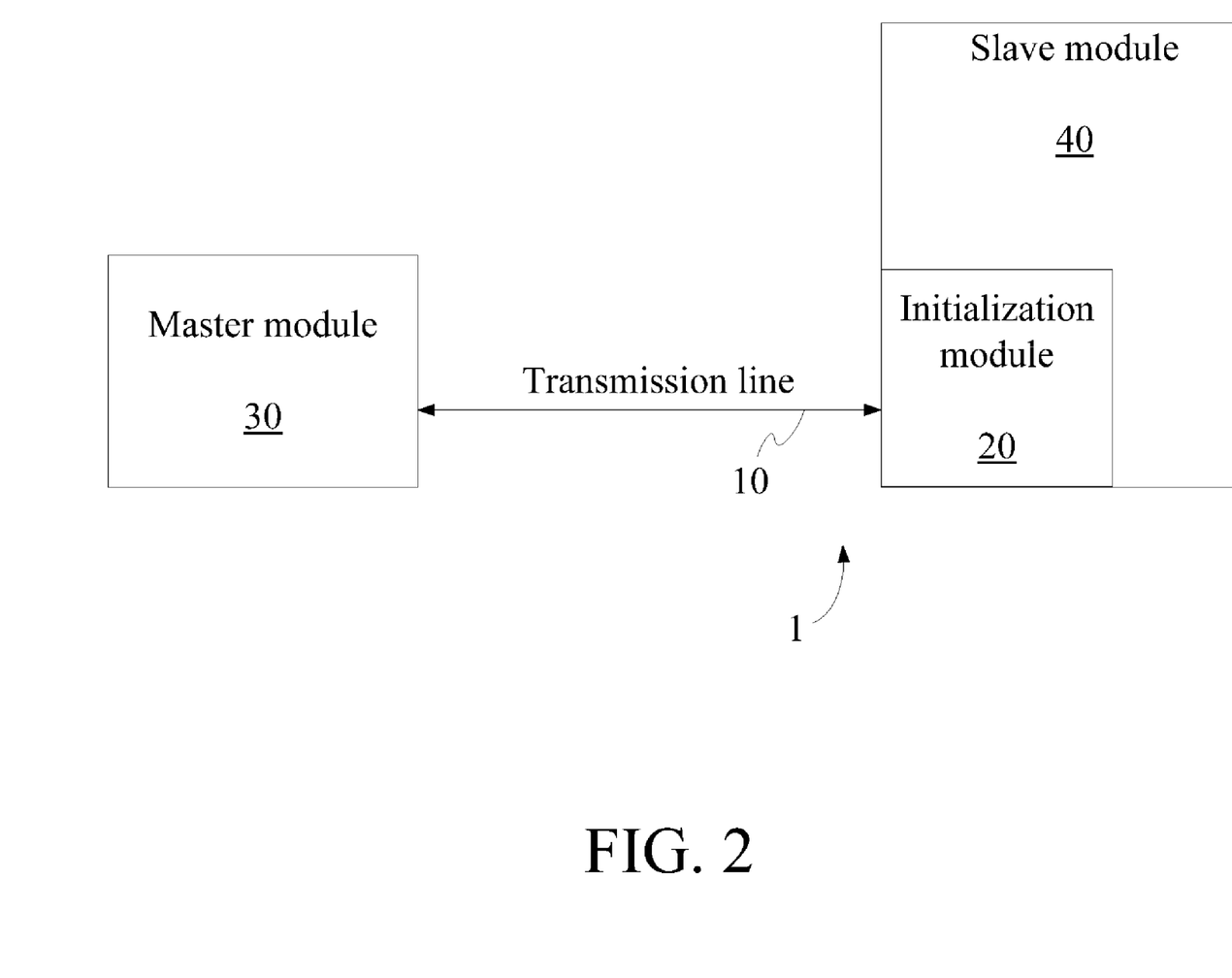
FIG. 2 is a schematic diagram of an embodiment of an interface transmission device according to the present invention.

FIG. 2 is a schematic diagram of an embodiment of an interface transmission device. The interface transmission device of the present invention is used to transmit and receive information between a master module 30 and a slave module 40, and the interface transmission device 1 includes a transmission line 10 and an initialization module 20.

The transmission line 10 is used to connect the master module 30 and the slave module 40. The interface transmission device 1 provided by the present invention only requires a single transmission line 10 between the master module 30 and the slave module 40, i.e., only occupying one pin, so that two pins are saved compared with the prior art in which three pins are used. The single pin used in the present invention is referred to as a general purpose input/output (GPIO) pin.

The initialization module 20 receives a bit period transmitted by the master module 30 via the transmission line 10, and a bit length of the transmitted information is determined according to the bit period. The interface transmission device 1 of the present invention only has one transmission line 10, unlike the prior art with three pins in which a transmission line (SCLK) is specifically provided for carrying a sampling clock. Therefore, before transmitting and receiving the information in the present invention, the bit period must be defined first. The bit period is generated by the master module 30 and transmitted to the slave module 40 via the transmission line 10. Then, the slave module 40 records the bit period. The bit period may be used to determine the bit length of the transmitted information, i.e., the bit length may be determined according to the bit period, so as to first define the length of each bit of the transmitted information between the master module 30 and the slave module 40. After that, the information is received and transmitted according to the bit length between the master module 30 and the slave module 40. The master module 30 may be a micro controller unit (MCU), and the slave module 40 may be a scaler IC.

Next, in combination with the interface transmission device 1 of the present invention, a transmission protocol directed to the single transmission line 10 between the master module 30 and the slave module 40 is provided.

Figure 3:
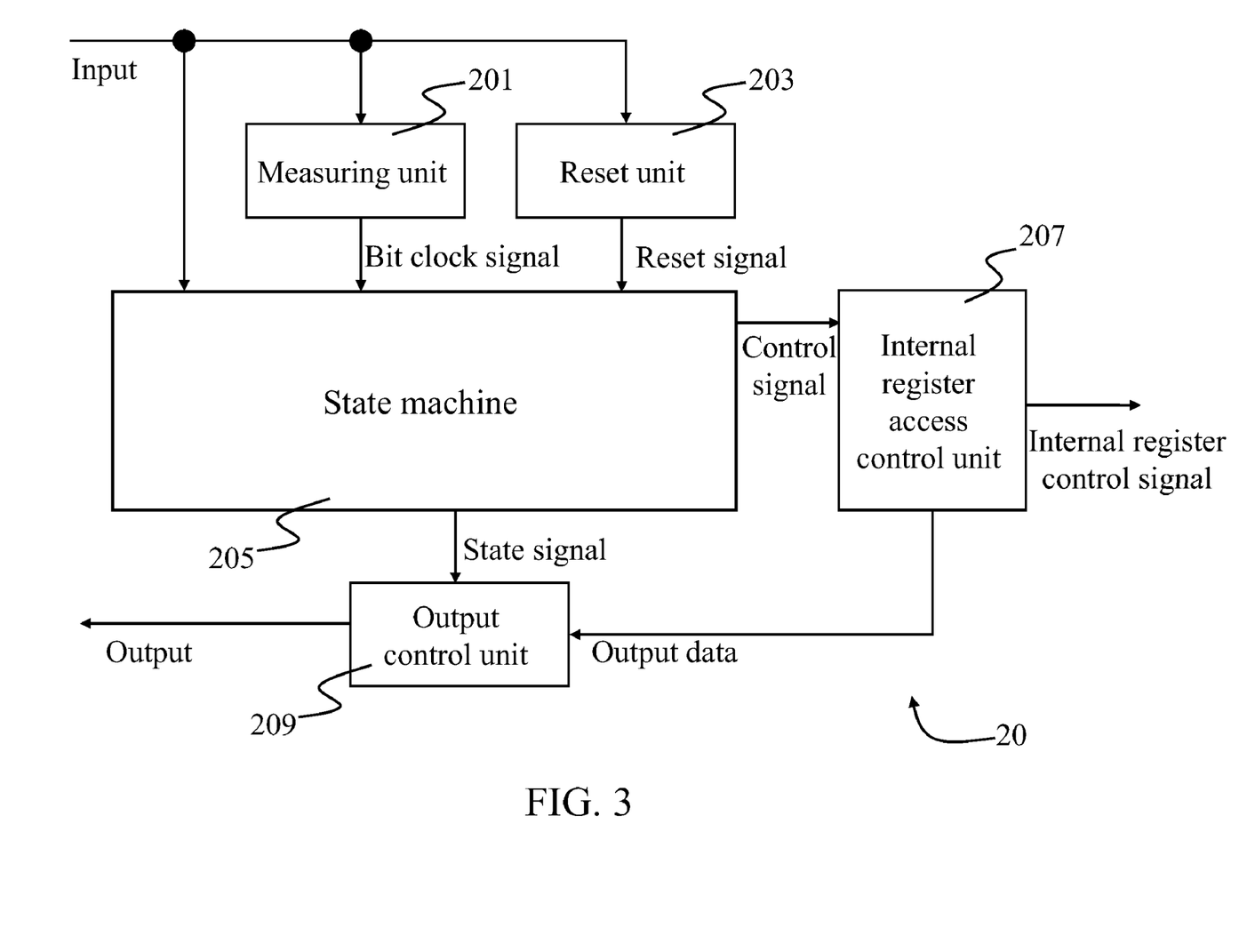
FIG. 3 is a schematic diagram of an embodiment of an initialization module in an interface transmission device according to the present invention.

FIG. 3 is a schematic diagram of an embodiment of the initialization module 20 in the interface transmission device. Referring to FIG. 3, the initialization module 20 includes a measuring unit 201, a reset unit 203, a state machine 205, an internal register access control unit 207, and an output control unit 209.

The reset unit 203 is used to detect whether a reset signal or an interrupt signal is received, so as to determine whether to issue a reset signal to reset the interface transmission device 1 after the interrupt. The measuring unit 201 is used to receive a bit period and measure the number of clocks of each bit in the bit period to generate a bit clock signal. The state machine 205 receives the transmitted information, the reset signal, and the bit clock signal, so as to determine the state of the initialization module 20 and generate a state signal and a control signal. The control signal includes a read control signal, a write control signal, an address, an input data, and a state signal. The internal register access control unit 207 is used to receive the control signal and generate an internal register control signal to access a register in the slave module 30. The internal register access control unit 207 outputs an output data according to the internal register control signal. The output control unit 209 is used to receive the state signal and the output data and determine whether to output the output signal or not. Additionally, the initialization module 20 may implement with a hardware description language (HDL), such as Verilog and VHDL. The behaviors of the initialization module 20 are written by means of functional descriptions, and desired circuits through synthesis with a circuit synthesis tool are thus obtained.

Figure 4:
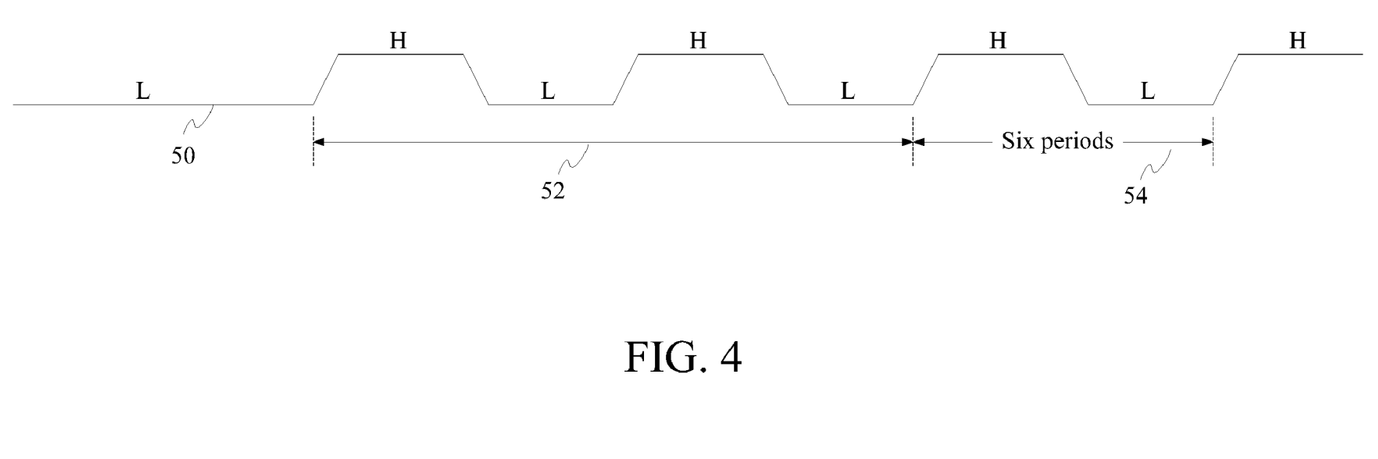
FIG. 4 is a timing diagram of reset/automatic learning of an interface transmission device according to the present invention.

FIG. 4 is a timing diagram of reset/auto learning of an interface transmission device according to the present invention. Referring to FIG. 4, first, the initialization module 20 receives a reset signal 50 from the master module 30 before receiving the bit period. Just as its name implies, the reset signal 50 is used to reset the interface transmission device 1, so as to receive the bit period subsequently. As shown in FIG. 4, the reset signal 50 may be a low-level signal. Furthermore, in order to avoid an error that the reset signal 50 ends before the resetting is completed due to an overly short reset signal 50, the present invention suggests that the reset signal 50 should have, but not limited to, at least a length of 4096 clocks. After completing the resetting through the reset signal 50, the bit period transmitted by the master module 30 is received. Referring to FIG. 4, a bit period 52 follows the reset signal 50, and the auto learning function of the present invention is activated. The bit period 52 transmitted by the master module 30 includes a toggling signal, and the bit period 52 is transmitted to the slave module 40. In FIG. 4, the bit period 52 includes, but not limited to, a high-level signal, a low-level signal, a high-level signal, and a low-level signal (H→L→H→L). The length of each high-level signal and low-level signal is fixed so as to define the bit length of the subsequently transmitted information.

After the initialization module 20 receives the bit period transmitted by the master module 30 via the transmission line 10, the slave module 40 records the bit period. Next, the slave module 40 returns the same a toggling signal to the master module 30 via the transmission line 10, i.e., a feedback signal 54 shown in FIG. 4. The feedback signal 54 in FIG. 4 returns a toggling signal of 12 bits in total, i.e., for example, but not limited to, returning six fixed H→L periods to the master module 30. Thereby, it is ensured that the slave module 40 has received the bit period from the master module 30 correctly, and the bit length required by the subsequent information receiving and transmission process is also explicitly determined. Finally, the initialization module 20 raises the signal to a high level and completes the reset/auto learning process.

After completing the above reset/auto learning process, the transmission/receiving of the information is performed. The transmitted information includes at least an address and at least a piece of data. As the signal is raised to a high level at last in the reset/auto learning process, before transmitting/receiving the information, a low-level signal is received as a start signal, so as to ensure that the interface transmission device prepares to transmit/receive the transmitted information. The length of the start signal may be same as that of the preset bit period.

The transmitted information includes a write signal. According to the write signal, the master module 30 transmits the address to the slave module 40, and then the master module 30 transmits the data to the slave module 40 to complete the writing of a single piece of data. That is to say, the process of writing a single piece of data is transmitting a piece of data after transmitting an address, so as to write the data into the address.

Accordingly, when reading data, a read signal is required to inform the interface transmission device that the data is to be read. Therefore, the transmitted information includes a read signal. According to the read signal, the master module 30 transmits an address to the slave module 40, and then the master module 30 receives the data returned by the slave module 40 to complete the reading of a single piece of data. That is to say, the process of reading a single piece of data is transmitting an address and then reading the piece of data stored in the address.

The writing/reading of a single piece of data requires to transmit/receive a piece of data after transmitting an address, so that when multiple pieces of data needs to be written/read simultaneously, the process is as follows: address→write signal/read signal→data→address→write signal/read signal→data→address→write signal/read signal→data . . . . Thus, before writing/reading each piece of data, an address must be transmitted first, which lowers the writing/reading speed. As a result, the transmitted information includes a byte count signal following the write signal or read signal. According to the byte count signal, after transmitting an address, the master module 30 writes/reads multiple pieces of data, such that the writing/reading process becomes: address→write signal/read signal→byte count signal→data→data→data . . . . Thereby, data writing/reading is accelerated. The byte count signal is combined with an increase bar signal. According to the increase bar signal, when writing/reading multiple pieces of data, the addresses are accumulated automatically, and thus the writing/reading process becomes: address→write signal/read signal→byte count signal→increase bar signal→data→data→data . . . .

Figure 5A:
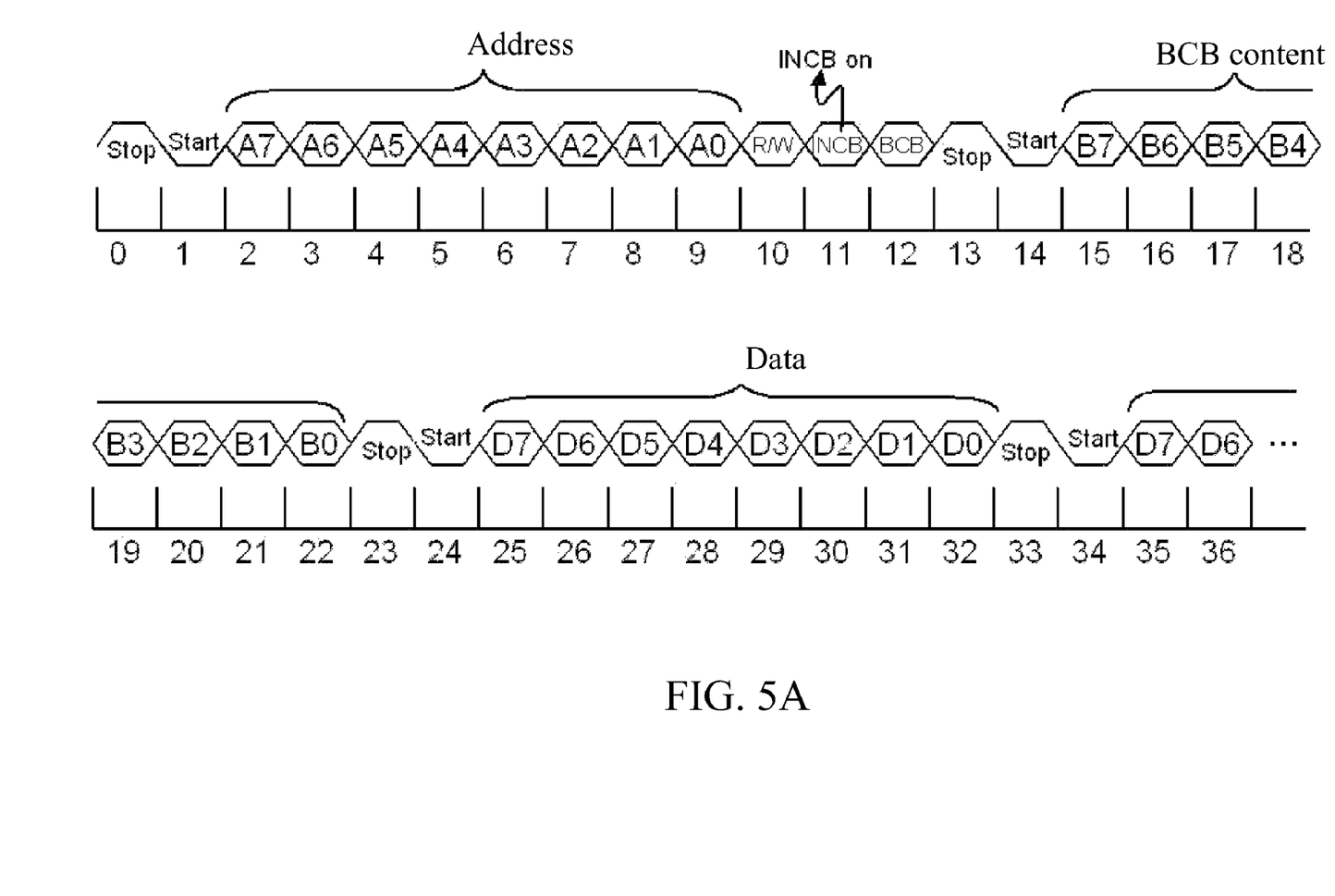
FIG. 5A is a data timing diagram of an embodiment of interface transmission of an interface transmission device according to the present invention.

For example, when the byte count signal (BCB) is on, and the increase bar signal (INCB) is also on, if the byte count signal is n (representing continuously writing/reading n pieces of data), after an address is transmitted, n pieces of data are continuously written into/read from the address in order, and the increase bar signal accumulates the address corresponding to each piece of data. For the writing process, each piece of data is stored in a different address as well. Referring to FIG. 5A, each unit time represents a data amount of a bit, A7 to A0 represents the address of a byte, B7 to B0 represents the content of the byte count signal (i.e., representing the data amount), and D7 to D0 represents the data of a byte.

Figure 5B:
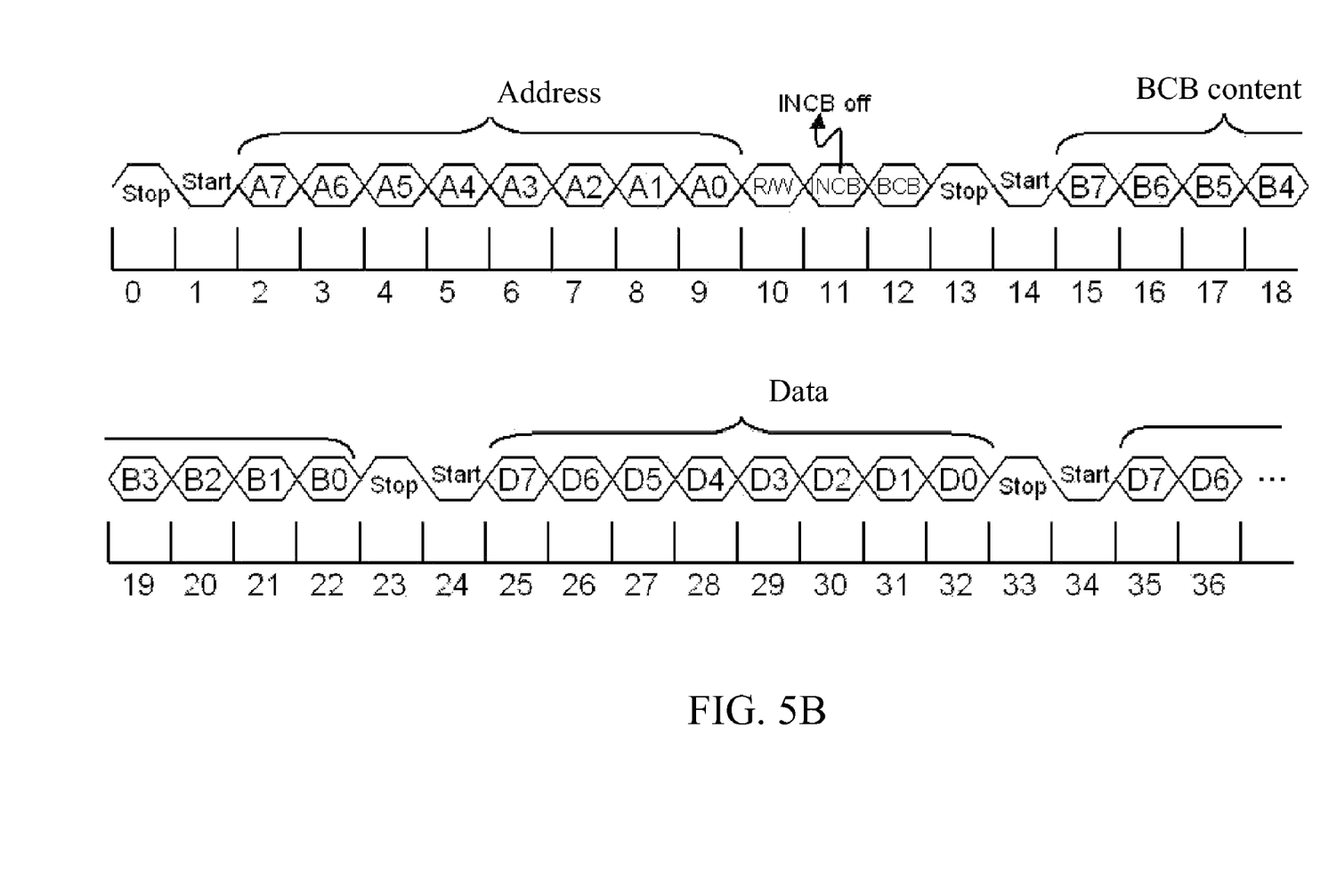
FIG. 5B is a data timing diagram of another embodiment of interface transmission of an interface transmission device according to the present invention.

Accordingly, when the byte count signal is on while the increase bar signal is off, if the byte count signal is also n, after an address is transmitted, n pieces of data are continuously written/read at the same address. As shown in FIG. 5B, each unit time represents a data amount of a bit, A7 to A0 represents the address of a byte, B7 to B0 represents the content of the byte count signal (i.e., representing the data amount), and D7 to D0 represents the data of a byte.

Furthermore, when a firmware is executed in the master device, the events of interrupt need be considered. Therefore, when the master module is interrupted, the initialization module 20 converts the transmitted information into a low-level signal, and again receives a reset signal after the interrupt, so as to repeat the aforementioned reset/auto learning process and transmit/receive the interrupted information again.

Figure 6:
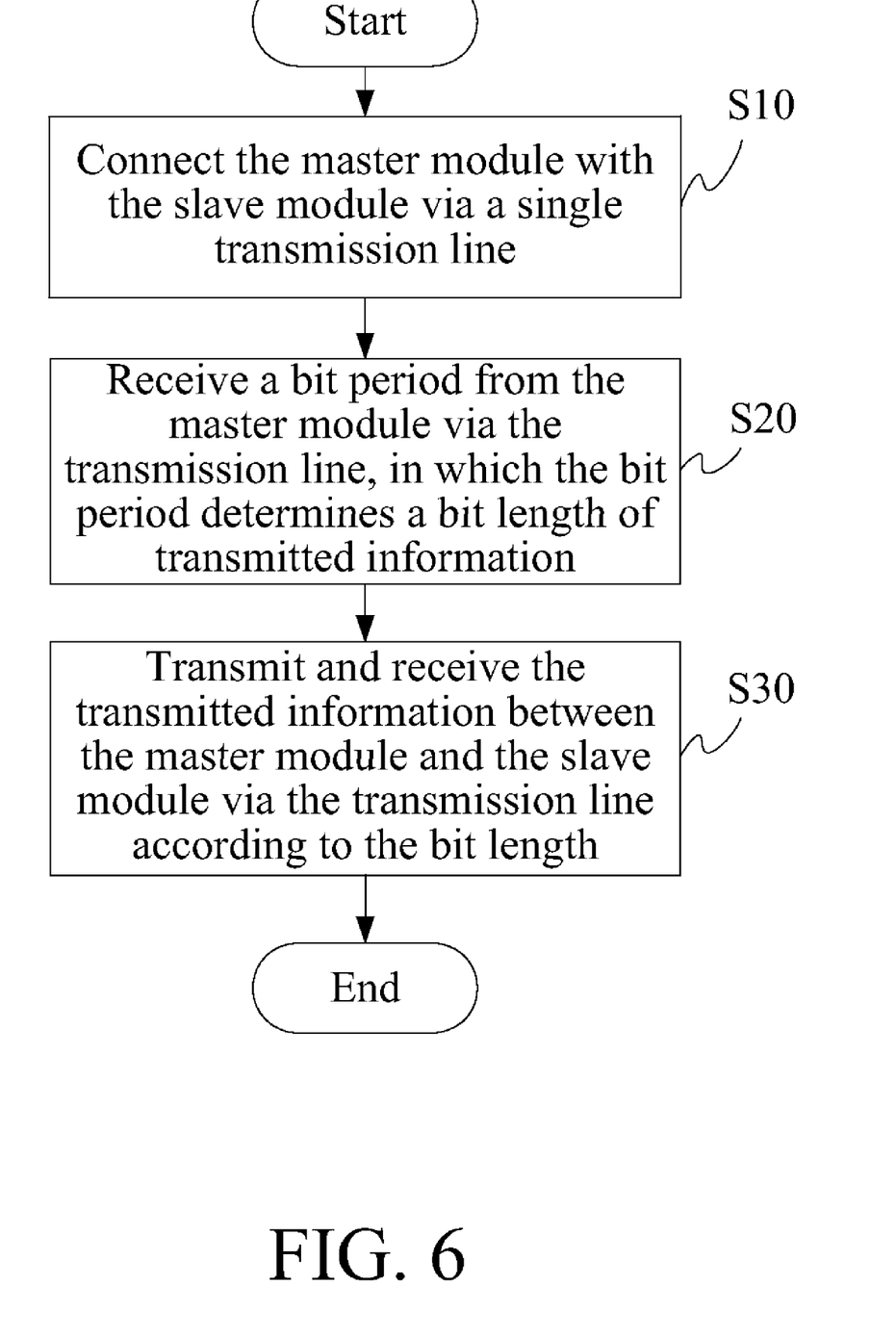
FIG. 6 is a flow chart of an interface transmission method according to the present invention.

FIG. 6 is a flow chart of an interface transmission method according to the present invention. The method includes the following steps.

In Step S10, a master module is connected to a slave module via a single transmission line. The master module may be an MCU, and the slave module may be a scaler IC.

In Step S20, a bit period is received from the master module via the transmission line, so as to determine a bit length of transmitted information. The bit period includes a toggling signal.

Additionally, before receiving the bit period, the reset signal transmitted by the master module is received first, and the reset signal is a low-level signal.

After receiving the bit period, the slave module returns the same toggling signal to the master module via the transmission line.

In Step S30, the information is transmitted and received between the master module and the slave module via the transmission line according to the bit length. The transmitted information includes at least an address and at least a piece of data.

Moreover, the transmitted information further includes a write signal, and the following steps are included. The master module transmits the address to the slave module according to the write signal. The master module transmits the data to the slave module according to the address transmitted by the master module. That is, after transmitting an address, the data is transmitted into the address, thereby completing the writing of a single piece of data.

The transmitted information further includes a read signal, and the following steps are included. The master module transmits the address to the slave module according to the write signal. The master module receives the data returned by the slave module according to the address transmitted by the master module. That is, after transmitting an address, the data in the address is read, thereby completing the reading of a single piece of data.

The transmitted information further includes a byte count signal, and the following steps are included. The master module transmits an address, and multiple pieces of data are written/read according to the byte count signal and the address transmitted by the master module. The byte count signal, together with the increase bar signal contained in the transmitted information, continuously writes/reads multiple pieces of data into/from the address in order according to the increase bar signal, and automatically accumulates the address.

Figure 7:
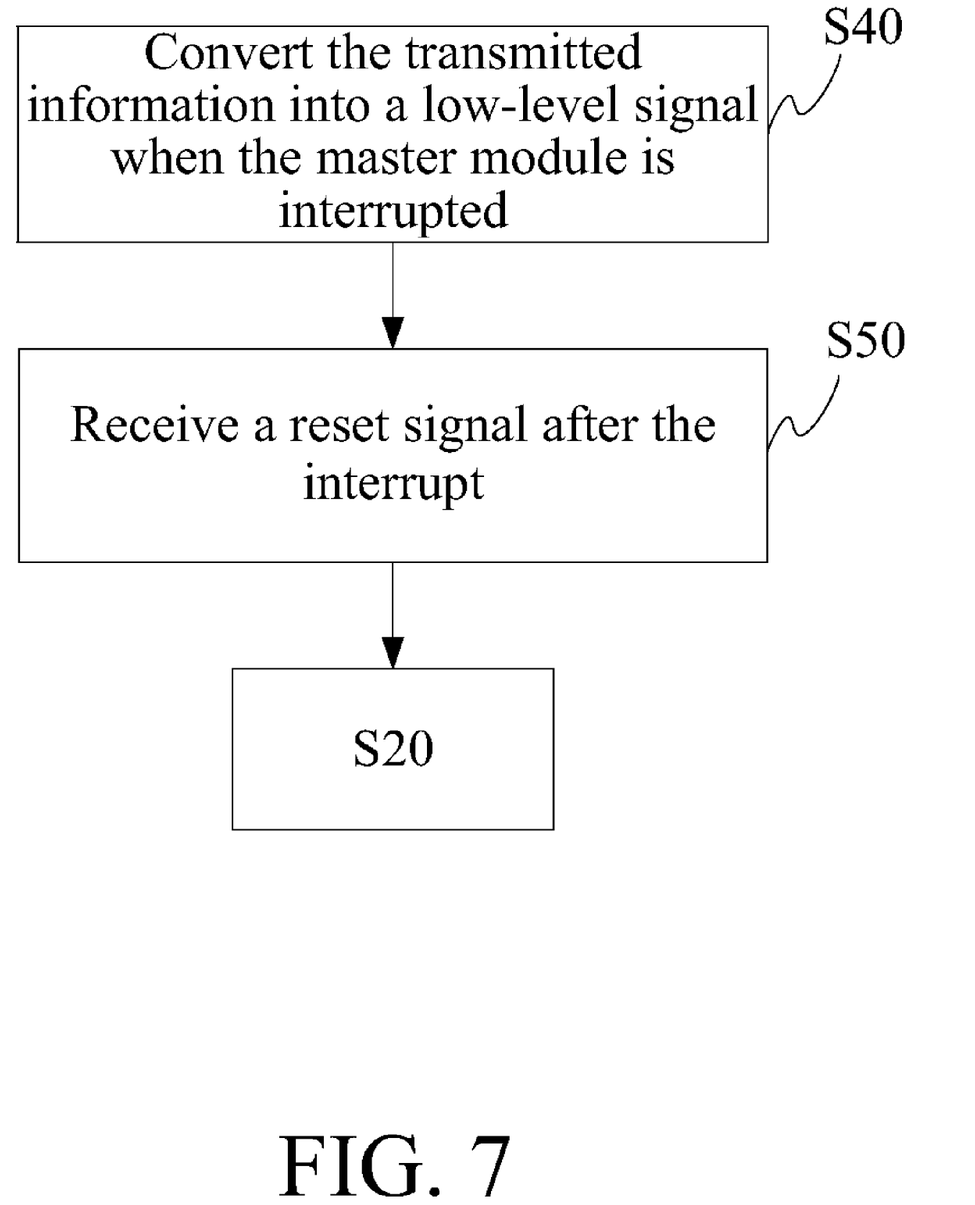
FIG. 7 is another flow chart of the interface transmission method according to the present invention.

FIG. 7 is another flow chart of the interface transmission method according to the present invention. The method includes the following steps.

In Step S40, when execution of a firmware is interrupted in the master device, the transmitted information is converted into a low-level signal.

In Step S50, after the interrupt, a reset signal is received. Thus, return to Step S20 in FIG. 6 to repeat the subsequent steps.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A device adapted to communicate as a slave device over a single-bit transmission line comprising:
   a reset detection circuit configured to detect a reset signal on the single-bit transmission line;
   a measuring circuit configured to determine a bit period by evaluating a first signal comprising a transition pattern on the single-bit transmission line immediately following the detection of the reset signal, the measuring circuit further configured to output a bit clock signal according to the determined bit period;
   circuitry to output a responsive toggling signal on the single-bit transmission line that confirms the bit period to a master device;
   circuitry to receive ensuing communications over the single-bit transmission line from the master device, communicated in accordance with the bit period.

2. The device according to claim 1, wherein the reset signal is a low-level signal.

3. The device according to claim 1, wherein the first signal comprises a toggling signal.

4. The device according to claim 1, wherein after the measuring circuit receives the first signal, the device transmits a feedback signal substantially the same as the first signal.

5. The device according to claim 1, wherein the communications further comprises address information and write/read information.

6. The device according to claim 5, wherein the communications further comprises a byte count signal.

7. The device according to claim 5, wherein the communications further comprises an increase bar signal.

8. The device according to claim 1, wherein when the reset detection circuit receives a reset signal, the device is reset.

9. The device according to claim 1, wherein the device is a scaler integrated circuit (IC).

10. An interface device, located in a first device, comprising:
   a transmission circuit generating an initialization signal, and generating an interface signal according to a bit length, wherein the initialization signal comprises a toggling signal with fixed-length low and high levels that define the bit length, and information about the interface signal is resolved according to the bit length; and
   a transmission interface receiving the initialization signal and the interface signal from the transmission circuit and transmitting the initialization signal and the interface signal, wherein after the transmission circuit transmits the initialization signal, the first device receives a signal transmitted from a remote device substantially the same as the initialization signal via the transmission interface.

11. The interface device according to claim 10, wherein the transmission circuit transmits a reset signal through the transmission interface before transmitting the initialization signal.

12. The interface device according to claim 11, wherein the reset signal is a low-level signal lasting a plurality of clock periods.

13. The interface device according to claim 10, wherein the interface signal further comprises address information and write/read information.

14. The interface device according to claim 13, wherein the interface signal further comprises a byte count signal.

15. The interface device according to claim 13, wherein the interface signal further comprises an increase bar signal.

16. The interface device according to claim 10, wherein the first device transmits a reset signal to initiate a remote device through the transmission interface after an interrupt.

17. The interface device according to claim 16, wherein the remote device is a scaler integrated circuit (IC).

18. The interface device according to claim 10, wherein the transmission interface is a 1-bit serial communication interface.

19. A transmission method applicable to a transmission interface and transmissions over a single-bit transmission line, comprising:
   receiving an initialization signal and an interface signal through the transmission interface, wherein the initialization signal is a toggling signal with fixed-length low and high levels;
   determining a bit length of the interface signal based on the initialization signal, the bit length determined by plural alternating high and low levels of the initialization signal;
   receiving information subsequently transmitted over the single-bit transmission line according to the bit length, wherein the information includes at least an address and data; and
   after receiving the initialization signal, transmitting a signal substantially the same as the initialization signal via the transmission interface.

20. The method according to claim 19, wherein a reset signal is received through the transmission interface before receiving the initialization signal.

21. The method according to claim 19, wherein the interface signal further comprises address information and write/read information.

22. The method according to claim 21, wherein the interface signal further comprises a byte count signal.

23. The method according to claim 21, wherein the interface signal further comprises an increase bar signal.

24. A transmission method applicable to a transmission interface and transmissions over a single-bit transmission line, comprising:
   generating an initialization signal comprising a bit period, wherein the initialization signal is a toggling signal with fixed-length low and high levels that define the bit period;
   generating an interface signal according to a bit length, the bit length derived from the bit period, wherein information about the interface signal is resolved according to the bit length;
   transmitting the initialization signal and the interface signal through the transmission interface over the single-bit transmission line, and
   after transmitting the initialization signal, receiving a signal substantially the same as the initialization signal via the transmission interface.

25. The method according to claim 24, further comprising:
   before transmitting the initialization signal, transmitting a reset signal through the transmission interface.

26. The method according to claim 24, wherein the interface signal further comprises address information and write/read information.

27. The method according to claim 26, wherein the interface signal further comprises a byte count signal.

28. The method according to claim 26, wherein the interface signal further comprises an increase bar signal.

29. The method according to claim 24, further comprising:
   transmitting a reset signal to initiate a remote device through the transmission interface.

30. The method according to claim 29, wherein the remote device is a scaler integrated circuit (IC).

31. The method according to claim 24, wherein the transmission interface is a 1-bit serial communication interface.

* * * * *